United States Patent [19]

Hori

[11] 4,279,750
[45] Jul. 21, 1981

[54] CONTINUOUS TREATMENT APPARATUS FOR TREATING WASTE MATERIAL

[76] Inventor: Mitutaka Hori, 3128-5 Ko-izumicho, Yamatokohriyama-shi, Nara-ken, Japan

[21] Appl. No.: 124,591

[22] Filed: Feb. 25, 1980

[30] Foreign Application Priority Data

Feb. 28, 1979 [JP] Japan .................................. 54-23665

[51] Int. Cl.³ ............................................. B01D 33/00
[52] U.S. Cl. ................................................. 210/357
[58] Field of Search ........................ 210/396, 397, 357

[56] References Cited

U.S. PATENT DOCUMENTS

| | | | |
|---|---|---|---|
| 1,877,449 | 9/1932 | Fulcher | 210/357 |
| 4,036,759 | 7/1977 | Donovan | 210/357 X |

Primary Examiner—Thomas G. Wyse
Attorney, Agent, or Firm—George B. Oujevolk

[57] ABSTRACT

A continuous treatment apparatus for treating sewage in a sewage treatment plant or waste liquid in a factory comprising a rotary drum wherein the peripheral wall is constituted by pectinately juxtaposed stationary rings and movable rings interposed with minute clearances therebetween and slidable in the circumferential direction so that the sewage is filtered through the said minute clearances while the drum is rotated, sludge or solids being intercepted on the outside of the drum while the sewage is filtered through the said minute clearances, the drum being free from clogging since the sludge or solids are ejected by the circumferential sliding of the movable rings.

1 Claim, 5 Drawing Figures

CONTINUOUS TREATMENT APPARATUS FOR TREATING WASTE MATERIAL

The invention relates to an apparatus for continuously treating sewage in a sewage treatment plant or waste liquid in a factory.

Generally, various problems of environmental polution are involved in the direct discharge of sewage or waste liquid into rivers due to sedimentation of sludge and the like. Thus, various methods have been resorted to, for example, preliminary sedimentation of sludge in a depositing reservoir, filtration of sewage or waste liquid by means of a filter, and the like.

However, the former method had a disadvantage in that a long period of time was necessitated until the sewage became stationary in the reservoir and then clarified by sedimentation. Moreover, not only much time and labor were necessitated for the removal of sediment after the discharge of the clarified water but also a very large area was required for the treatment plant.

The latter method also had a disadvantage in that clogging of the filter cloth not only reduced the operational efficiency but also rendered continuous operation impracticable.

According to the invention, sewage is treated by a rotary drum without interruption thereby enabling to improve the operational efficiency through continuous operation. The peripheral wall of the said rotary drum comprises stationary rings provided in comblike juxtaposition and movable rings interposed with minute clearances therebetween and slidable in the circumferential direction so that the sewage is filtered through the said minute clearances.

The invention has for an object to provide a sewage treatment apparatus wherein sewage is filtered through the drum, that is, through the minute clearances between the stationary rings and the movable rings constituting the peripheral wall of the drum, sludge or solids being intercepted on the outside of the drum, the drum being free from clogging due to circumferential slidability of the movable rings, thereby enabling to continue the operation without interruption.

The accompanying drawings show a preferred embodiment of the invention.

Figure 1:
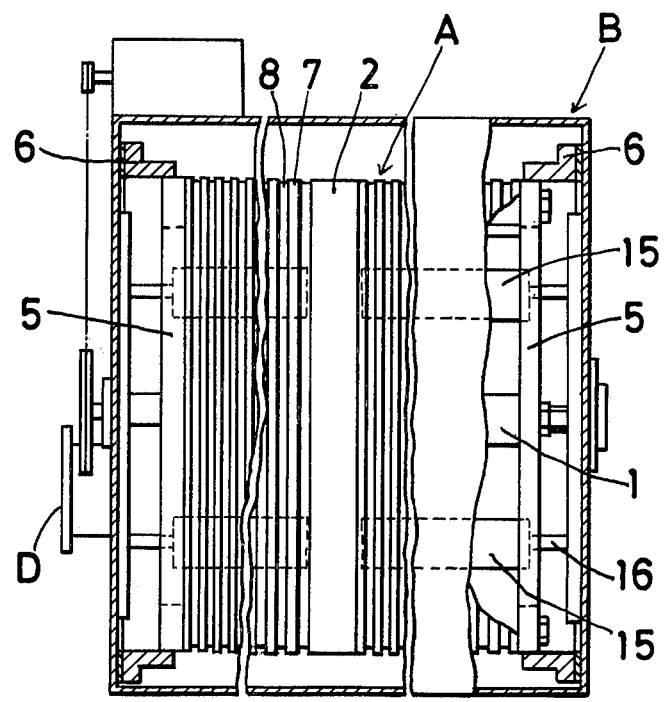
FIG. 1 is an elevational view, broken away in part, showing part of the apparatus according to the invention.
Figure 2:
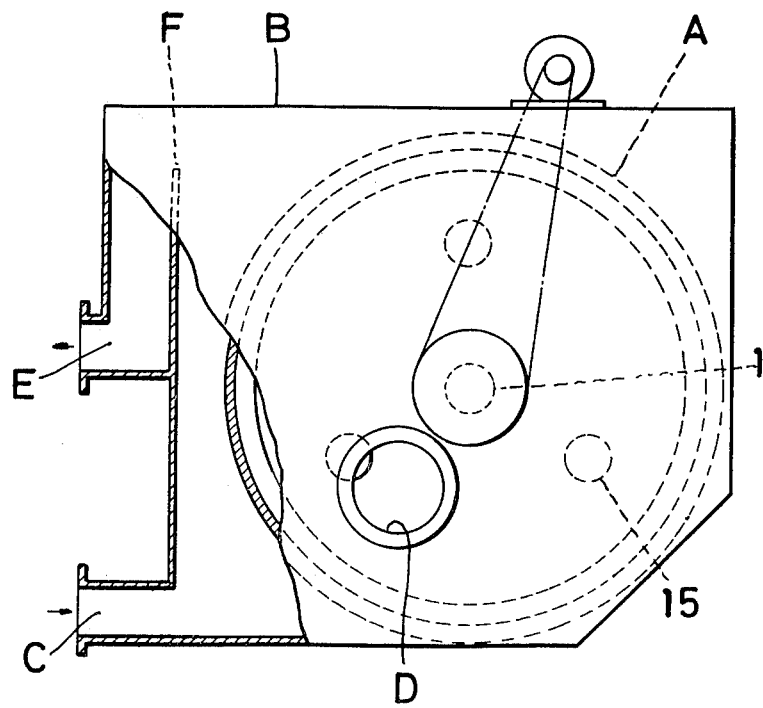
FIG. 2 is a side view of the same.

Referring to FIGS. 1 and 2, (A) designates a drum for treating waste liquid therein, the drum (A) being provided in a tank (B).

Sewage or waste liquid supplied to the tank (B) is filtered through the minute clearances on the outer peripheral wall of the drum (A), the resultant filtrate being discharged through a discharge port (D) of the drum.

(E) designates a discharge port provided on the upper part of the tank (B) for dischargeing the sewage overflowing a partition wall (F). The discharged sewage may be led to the supply port (C) again.

Figure 3:
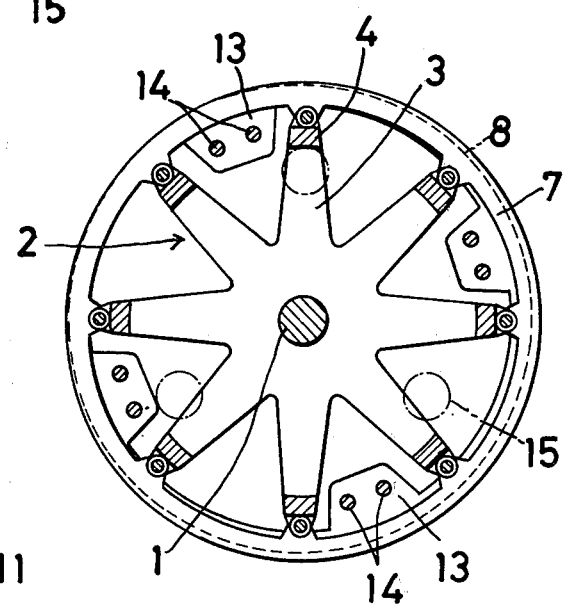
FIG. 3 is a sectional view of the apparatus.

The invention is principally featured by the structure of the drum (A). As shown in FIG. 1, a drive shaft 1 is provided across the center of the drum (A), a base plate 2 being provided intermediately on the drive shaft 1. The base plate 2 has arms 3 radially extending with the drive shaft 1 as the center as shown in FIG. 3.

A supporting member 4 is erected on each side of the forward end of the arm 3 in parallel with the drive shaft 1, each end of the supporting members 4 being secured to an annular terminal plate 5 provided adjacent the end of the drum (A), respectively.

To be more precise, the drum (A) is provided with a drive shaft 1 across the center thereof, from the forward end of each arm of a base plate 2 provided intermediately on the drive shaft 1 there being erected a supporting member 4 in parallel with the drive shaft 1 so as to be suitably spaced circumferentially from each other, the end of the supporting member 4 being secured to an annular terminal plate 5. The side wall of the tank (B) is provided with a seal member 6 so that the terminal plate 5 is watertightly rotatable.

The stationary rings 7 and the movable rings 8 constituting the outer peripheral wall of the drum (A) are supported by the said supporting members 4 and the members to be described hereinunder.

Figure 4:
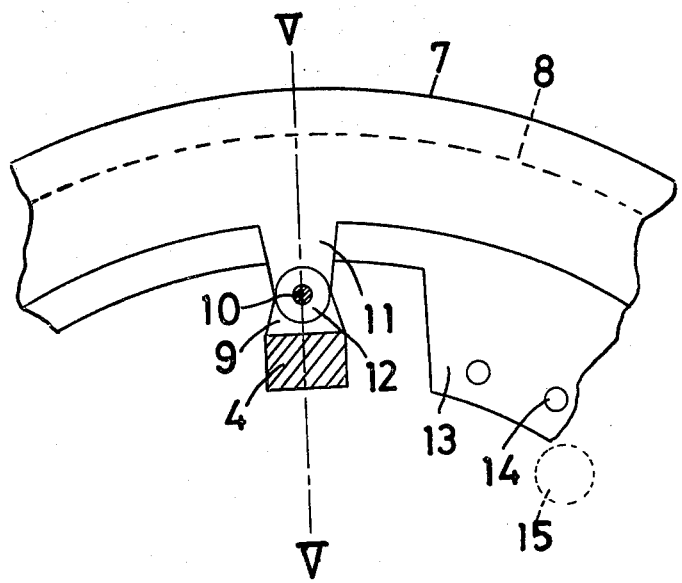
FIG. 4 shows part of a stationary ring, on a magnified scale, in the state wherein it is secured to a supporting member in the drum.
Figure 5:
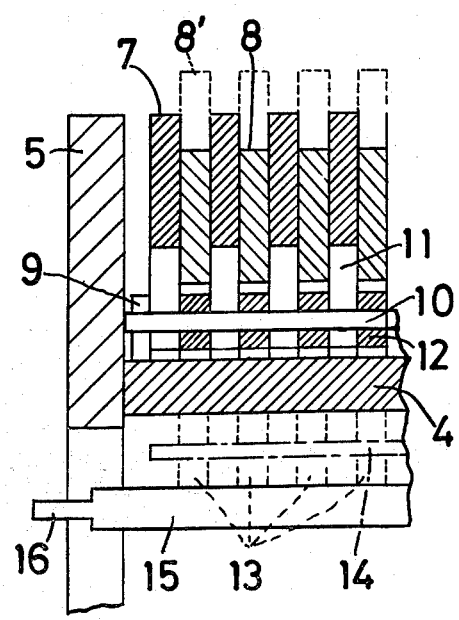
FIG. 5 is a sectional view taken by the line V—V of FIG. 4.

As shown in FIGS. 3 to 5, each of the stationary rings 7 is supported in such manner that a shaft member 10 transversely mounted with interposition of a securing element 9 on the supporting member 4 transversely mounted between the base plate 2 and each terminal plate 5 is extended through a hole of a projection 11 provided on the inner edge of each stationary ring 7. The stationary rings 7 are suitably spaced by interposing a spacer 12 betwen the said projections 11, respectively.

The movable rings 8 are interposed with minute clearances between the stationary rings 7, respectively. Unlike the case of the stationary rings 7, the movable rings 8 are not secured by extending the shaft member through the holes of the projections 11, but have their inner edges loosely fitted onto the spacers 12.

Each of the rotary rings 8 is provided on its inner edge with a plurality of cams 13, the corresponding cams being integrally connected by extending a shaft member 14 therethrough. A cam motion produced by the coordination between the cams 13 and rotors 15 shown in FIG. 1.

The rotors 15 are erected on the side walls of the tank (B) so as to project into the drum (A) with interposition of mounting shafts 16. The rotors 15 are permanently stationary independently of the rotation of the drive shaft 1.

If the drive shaft 1 is rotated, each arm 3 of the base plate 2 is synchronously rotated thereby rotating the drum in one direction with the supporting members 4. Waste liquid continuously supplied to the tank (B) through the supply port (C) thereof is filtered through the minute clearances between the stationary rings 7 and the movable rings 8 constituting the outer peripheral wall of the drum (A).

The said minute clearances permit the passage of liquid alone whilst intercepting the passage of sludge or solids therethrough. Thus, liquid only is permitted to enter the drum (A) and discharged through the discharge port (D) thereof.

As the drum (A) is rotated, one of the cams 13 of the movable ring 8 runs onto a stationary rotor 15 thereby causing the said movable ring 8 to slide in the direction of the outer periphery to the position of 8'. As a result, sludge or solids clogging the minute clearances between the stationary rings 7 and the movable rings 8 are ejected thereby enabling to keep the said minute clearances clean at all times.

Thus, filtration can be continued without interruption and consequently without a reduction in the operational efficiency.

According to the invention, as described hereinabove, the drum is constituted by comblike stationary rings and movable rings interposed with minute clearances therebetween. Moreover, the movable rings are adapted to be circumferentially slidable thereby enabling to eject clogging sludge and the like and keep the drum permanently clean. Since continuous filtration is practicable without interruption, the operational efficiency can be remarkably improved.

According to the preferred embodiment, the movable rings are adapted to slide circumferentially by cam means. The cam means, however, can be replaced by eccentric means.

What is claimed is:

1. A tank apparatus for continuously treating sewage or waste liquid by means of a drum within the tank, comprising in combination:

(a) a central drive shaft (1) disposed between annular terminal plates (5) defining a filtering zone therebetween in said tank;
   (b) a base plate (2) intermediate said terminal plates (5), arms (3) on said base plate (2) said arms having a forward end and a supporting member (4) on each side of said forward end, said supporting member (4) being in parallel with said drive shaft;
   (c) stationary rings (7) and movable rings (8) both defining the outer peripheral wall of said drum, both supported by said supporting member (4) both said rings having an inner edge, a projection (11) with an aperture on the inner edge of each stationary ring (7), a spacer means (12) interposed between said projections (11), a first shaft member (10) transversely mounted between the base plate (2) and each terminal plate extending through said aperture, said movable rings (8) being interposed between said stationary rings (7) with a minute clearance therebetween; and,
   (d) a plurality of cams (13) on the inner edge of said movable rings (8), with a second shaft member (14) connecting said cams (13), also rotor means (15) extending across said drum cooperating with said cams (13) to produce a cam motion, since as the drum is rotated, one of the cams (13) runs into the rotor (15) causing the corresponding movable ring (8) to slide so as to eject sludge.

* * * * *